United States Patent [19]
van der Lely

[11] 3,965,658

[45] June 29, 1976

[54] MOWING MACHINES

[76] Inventor: Cornelis van der Lely, 7, Bruschenrain, Zug, Switzerland

[22] Filed: May 14, 1974

[21] Appl. No.: 469,772

[30] Foreign Application Priority Data
May 15, 1973   Netherlands .................... 7306705

[52] U.S. Cl. ...................................... 56/192; 56/6; 56/295
[51] Int. Cl.² ...................................... A01D 55/22
[58] Field of Search ................. 56/295, 6, 192, 255

[56] References Cited
UNITED STATES PATENTS

| | | | |
|---|---|---|---|
| 2,488,140 | 11/1949 | Phillips et al. | 56/17.2 |
| 2,933,874 | 4/1960 | Sonmore et al. | 56/320.2 |
| 3,395,522 | 8/1968 | Zweegers | 56/295 |
| 3,443,369 | 5/1969 | Zweegers | 56/6 |
| 3,715,874 | 2/1973 | Goserud | 56/295 |

FOREIGN PATENTS OR APPLICATIONS

| | | | |
|---|---|---|---|
| 1,520,474 | 1/1967 | France | 56/192 |
| 1,582,356 | 10/1967 | Germany | 56/192 |
| 1,119,645 | 7/1968 | United Kingdom | 56/192 |

*Primary Examiner*—Russell R. Kinsey
*Attorney, Agent, or Firm*—Mason, Mason & Albright

[57] ABSTRACT

A mowing machine has a frame, including a coupling frame and a laterally extending support beam on which a rockable beam with mowing members are rotatably mounted. A further beam and a boom interconnect the support beam in operative position. By repositioning the further beam and pivoting the support beam to the rear, the machine can be placed in a transport position. Each mowing member is turnable about an upwardly extending axis and has an upper sheath or cover and a bottom to which dish support members are rotatably supported on holders that are spaced from the member's axis of rotation. The cover is formed of conical surfaces which have air holes and lower openings through which air passes during rotation. Cutting elements are pivoted at the outer circumference of the cover on a felly with radial spokes which are journalled on the mowing member's axis of rotation.

29 Claims, 8 Drawing Figures

MOWING MACHINES

For a better understanding of the invention and to show how the same may be carried into effect, reference will now be made, by way of example, to the accompanying drawings, in which:

FIG. 5 is a plan view of part of a rotor shown in the sectional view of FIG. 4, showing one form of cutter construction.

Figure 1:
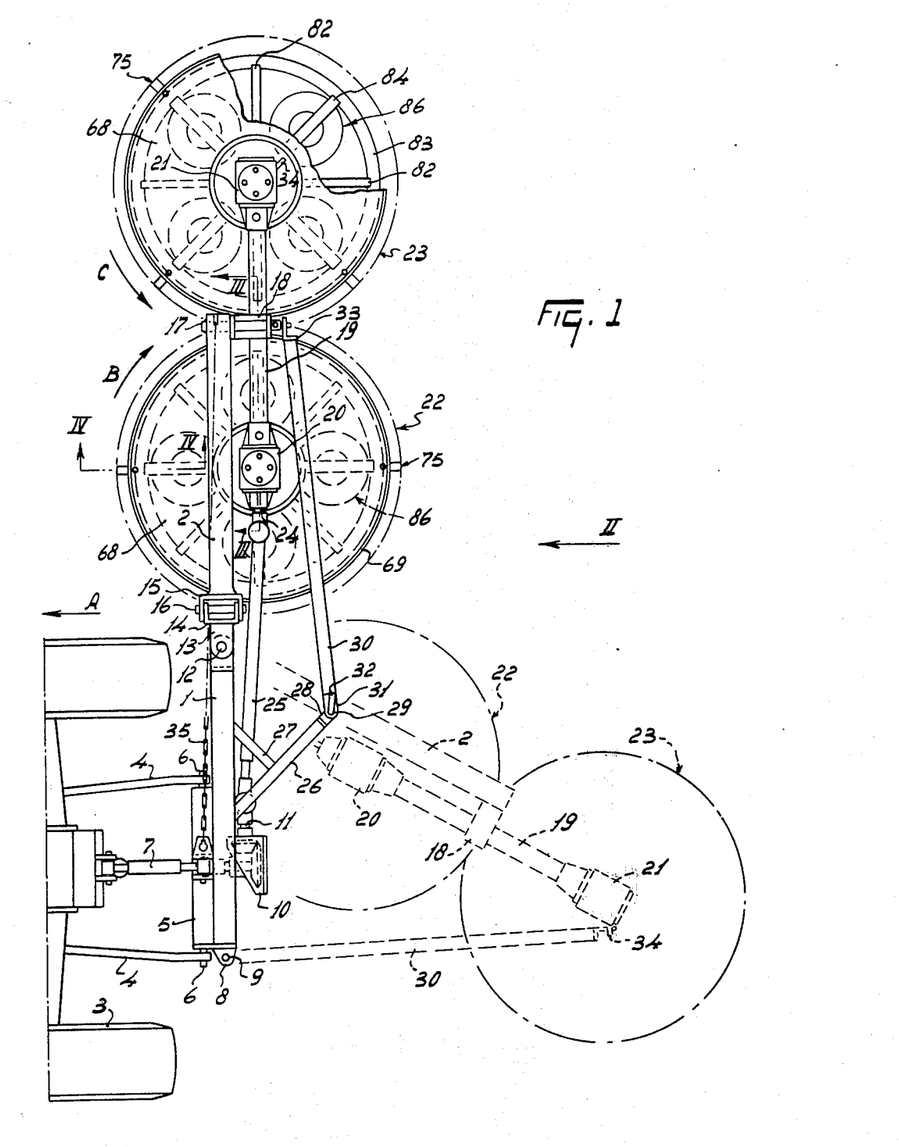
FIG. 1 is a plan view of a mowing machine.

Referring first to FIG. 1, the machine has a frame which includes a horizontal coupling beam 1 extending transversely of the intended direction of operative travel A and disposed in use of the mower, behind a tractor 3 that moves the machine so that one end of the coupling beam 1 as viewed with respect to the direction of travel A is located adjacent and behind the rearmost end of the one of the two lifting arms 4 of the lifting device of the tractor 3, whereas the other end of the beam 1 is located near the vertical lateral boundary plane of the tractor 3 lying in the direction of travel A.

Viewed on plan, the front of the beam 1 is provided with a mounting frame 5, which has the shape of an inverted V or U, viewed in the direction of travel A, horizontal pins 6 extending transversely of the direction of travel A being secured near the two free ends of this mounting frame. These pins 6 can be fastened in holes near the rearmost ends of the lifting arms 4. Near the topmost point of the mounting frame 5 a fastening structure 7 is provided for holding the rearmost end of the top arm of the lifting device of the tractor 3. The length of this topmost lifting arm is adjustable. Viewed in the direction of travel A, the free end of one of the lifting arms 4 has arranged behind it on the adjacent end of the beam 1 an ear 8 having a hole 9, the center line of which is approximately vertical.

On the rear of the beam 1, viewed with respect to the direction of travel A, a gear box 10 is arranged, the input shaft of which extends horizontally in the direction of travel A with its center line located, in operation, approximately in the vertical longitudinal plane of symmetry of the tractor 3. The gear box 10 has an output shaft 11, the center line of which is approximately horizontal and at right angles to the direction of travel A. The output shaft 11 is directed away from the ear 8.

Figure 2:
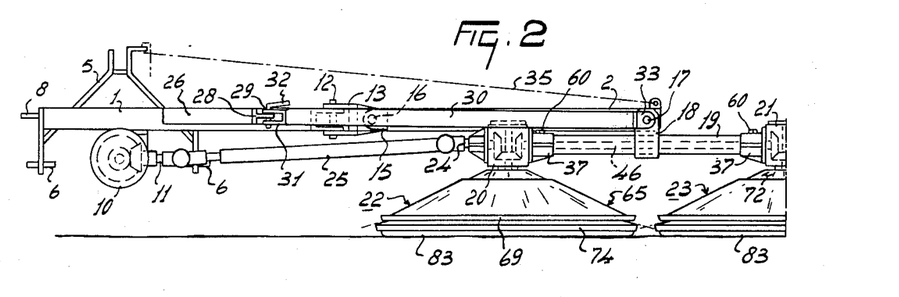
FIG. 2 is a rear view of part of the machine of FIG. 1, taken in the direction of the arrow II in FIG. 1, FIGS. 3 and 4 are sectional views of parts of the machine of FIGS. 1 and 2 taken on the line III—III and IV—IV respectively in FIG. 1.

Near the end of the coupling beam 1 remote from the ear 8, this beam is provided with an approximately vertical pivotal shaft 12. A supporting beam 2, located practically completely outside the vertical outer boundary plane of the tractor 3 in the direction of travel A, is adapted to turn about the pivotal shaft 12 with respect to the coupling beam 1, but viewed on plan and from the rear it is located in operation in line with the coupling beam 1. The supporting beam 2 is fastened to the pivotal shaft 12 by means of approximately horizontal ears 13 (FIGS. 1 and 2). The ends of these ears 13 remote from the pivotal shaft 12 are secured to a fork 14 which is partly surrounded by a second fork 15 which is rigidly secured to the inboard end of the supporting beam 2. The two forks 14 and 15 and hence the ears 13 and the supporting beam 2 are relatively pivotable about an approximately horizontal pivotal shaft 16 extending in the direction of travel A near the pivotal shaft 12.

Near the end of the supporting beam 2 remote from the pivotal shaft 12 an approximately horizontal pivotal shaft 17 extends in the direction of travel A and parallel to the pivotal shaft 16. The distance between the end of the coupling beam 1 near the ear 8 and the pivotal shaft 12 is approximately equal to the distance between the pivotal shafts 12 and 17.

The coupling beam 1 and the supporting beam 2 are both formed by hollow tubes preferably having a square or rectangular section.

The pivotal shaft 17 extends behind the rear of the supporting beam 2 over a distance approximately twice or two and a half times the width of the supporting beam 2, viewed on plan (FIG. 1). About the portion of the pivotal shaft 17 projecting behind the supporting beam 2 is freely pivotable a rocking piece 18, to the lower side of which is rigidly secured a tubular frame beam 19 of circular cross-section. The frame beam 19 extends in operation, viewed on plan, parallel to the coupling beam 1 and to the supporting beam 2 and hence at right angles to the direction of travel A. The frame beam 19, viewed on plan, is located on either side of the center line of the pivotal shaft 17 and the two ends of this frame beam are located at equal distances from the center line of the pivotal shaft 17.

Near the two ends of the frame beam 19 gear boxes 20 and 21 are arranged for driving two mowing rotors 22 and 23 respectively. The rotors 22 and 23 are adapted to rotate about relatively parallel, upright rotary shafts and can be driven so that they rotate in opposite senses (arrows B and C). The rotary shafts of the rotors 22 and 23 extend in operation parallel to a vertical plane in the direction of travel A. The distance between the rotary shafts of the rotors 22 and 23 is approximately equal to the length of the coupling beam 1 from the ear 8 to the pivotal shaft 12. The horizontal distance between the rotary shaft of the rotor 22 nearest the tractor 3 and the vertical lateral boundary plane of the tractor 3 in the direction of travel A is approximately equal to at least half the distance between the two rotary shafts of the rotors. The gear box 20 has an input shaft 24 extending approximately horizontally and transversely of the direction of travel A towards the gear box 10. The output shaft 11 of the gear box 10 can be coupled by means of an auxiliary shaft 25, provided with two universal hinges, with the input shaft 24. Since, viewed on plan, the pivotal shaft 17 cannot turn with respect to the supporting beam 2, the two rotors 22 and 23 together with the frame beam 19 holding them can swing to and from in an approximately vertical direction about the pivotal shaft 17.

On the rear of the coupling beam 1, viewed on plan, near one of the sides of the gear box 10, an approximately horizontal boom 26 is inclined to the rear. This boom is formed by a beam and, viewed on plan, it is at an angle of about 45° to, the direction of length of the coupling beam 1 and, viewed transversely of the direction of travel A, the rear end thereof is located nearer the rotors 22 and 23 than its fastening point on the beam 1. The connection between the boom 26 and the beam 1 is further stiffened by a strut 27. The boom 26 is provided at its rearmost end with an ear 28 having a hole 29, the center line of which is approximately vertical. Between the rearmost end of the boom 26 and the rearmost end of the pivotal shaft 17 an approximatly horizontal setting beam 30 is detachably fastened. The setting beam 30 is provided for this purpose with a fork 31 having holes, the center lines of which register with one another and the diameter of which is approximately equal to the diameter of the hole 29 in the ear 28. The setting beam 30 can be fastened to the boom 26 by means of a locking pin 32 which can be passed through the holes in the fork 31 and the hole 29 in the ear 28. The end of the setting beam 30 remote from the fork 31 is provided with an ear 33 having a hole by means of which the ear can be slipped onto the rearmost end of the pivotal shaft 17 and be connected thereto. The boom 26 and the setting beam 30 hold the coupling beam 1 and the supporting beam 2 in operation in the relative positions shown in FIG. 1, in which the supporting beam 2 is capable of swinging about the pivotal shaft 16 with respect to the beam 1 in upward direction, the setting beam 30 being capable of following these relative changes in positions because the ear 33 can turn about the pivotal shaft 17, while the fork 31 surrounds the ear 28 with a given amount of clearance.

If the ear 33 of the setting beam 30 is loosened from the rear end of the pivotal shaft 17 and the locking pin 32 is removed, so that the setting beam 30 can be removed, the supporting beam 2 together with the frame beam 19 fastened thereto and the rotors 22 and 23 can be turned rearwardly about the pivotal shaft 12 through an angle of about 120° to a transport position, shown in broken lines in FIG. 1. This position can be fixed by fastening the setting beam 30 with the aid of the fork 31 and the locking pin 32 to the ear 8 of the fastening beam 1 (the locking pin 32 being passed through the holes in the fork 31 and the hole 9), and by slipping the hole in the ear 33, at the other end of the setting beam 30, onto a pin 34 provided on the rear of the gear box 21 of the rotor 23. In this transport position the setting beam 30 is approximately horizontal and extends in the direction of travel A.

The outermost end (operational position) of the supporting beam 2 is provided with a fastening point for a chain 35 of adjustable length extending between this end of the supporting beam 2 and the top of the frame 5 and by means of which in operation the supporting beam 2 can be held in an approximately horizontal position but able to pivot about the pivotal shaft 16. Thus the beam 2 is allowed to turn upwards or downwards for matching unevennesses of the ground.

The frame beam 19 is provided near each of its ends with an internal annular shoulder 36 (FIG. 3) into which are screwed bolts 40 that serve to hold a gland 39 in engagement with a sleeve 37, of which there is one on each end of the frame beam 19. To this end, each gland 39 is engaged with an annular stop surface 38 on the inner side of the associated sleeve 37 and in the same plane as the head face of the frame beam 19. The bolts pass through elongated holes in the gland 39, which is arranged coaxially to the center line of the frame beam 19 and is urged by the bolts 40 slightly against the stop surface 38, the sleeve 37 thus being prevented from sliding away outwardly from the frame beam 19.

Figure 3:
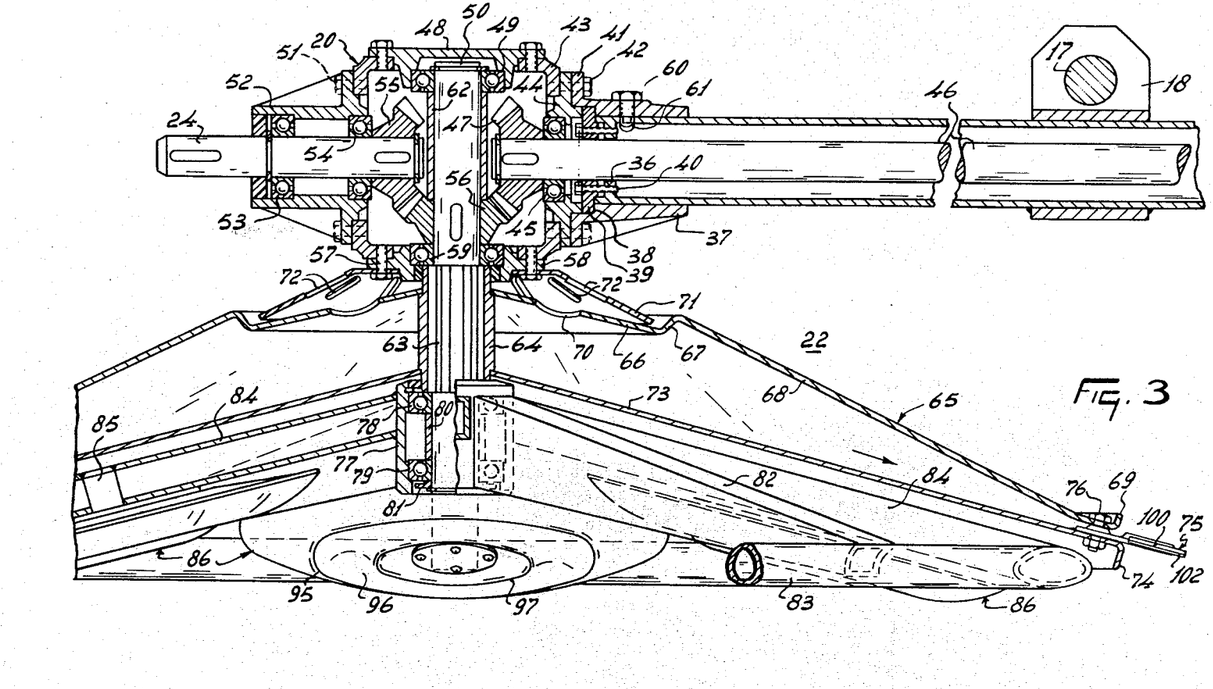

The sleeve 37 has a circular flange 41 which is fastened by bolts 42 to a frame housing 43 which is formed by interconnected small metal beams disposed along the sides of a cube. Between the frame housing 43 and the flange 41 is clamped a bearing holder 44 having a ball bearing 45 mounting a drive shaft 46 which transmits the rotary movement of the rotor 22 to the rotor 23. The center line of the drive shaft 46 coincides with the center line of the tubular frame beam 19 and extends in operation approximately in a horizontal direction transverse of the direction of travel A. The drive shaft 46 terminates inside the frame housing 43 and is provided near its end with a bevel gear wheel 47.

On the top of the frame housing 43 a cover forming a bearing holder 48 is fastened by bolts, this cover having a ball bearing 49 which supports the top end of the rotary shaft 50 of the rotor 22.

By means of bolts 51 a supporting sleeve 52 is fastened to the side of the frame housing 43 opposite the sleeve 43. The supporting sleeve 52 is provided in its interior with two ball bearings 53 and 54 spaced apart from one another in an axial direction and forming axial bearings mounting the input shaft 24. The end of the input shaft 24 near the rotary shaft 50 is provided with a bevel gear wheel 55 which is in mesh with a bevel gear wheel 56 on the rotary shaft 50, the wheel 56 keyed to the shaft 50 at such a level that it is located beneath the input shaft 24 and the drive shaft 46. The top of the bevel gear wheel 56 is held by a spacing sleeve 62 at a distance from the lower side of the bearing 49. The gear wheel 56 is in mesh with the gear wheel 47.

The frame housing 43 is provided on the lower side with a lower cover or bearing holder 58 fastened by bolts 57 and having a ball bearings 59, the center line of which coincides with that of the rotary shaft 50 and therefore extends upwardly. The ball bearing 59 is located beneath the center line of the input shaft 24 and that of the drive shaft 46 and is spaced apart from the bearing 49 on the top of the frame housing 43.

The sleeve 37 is prevented from sliding axially in the direction away from the rocking piece 18, as stated above, since the stop surface 38 engages the gland 39, which is secured by means of the bolts 40 against an axial displacement with respect to the frame beam 19. The sleeve 37 is secured in place in the direction towards the rocking piece 18 since the bearing holder 44 fastened by the bolts 42 to the sleeve 37 is urged in this direction against the gland 39 and hence also against the end of the frame beam 19.

The whole assembly of the gear box 20, the rotary shaft 50 and the rotor 22 is able to turn with respect to the frame beam 19 about a pivotal axis coinciding with the center line of the drive shaft 46. This is allowed by permitted pivotal movement of the sleeve 37 about the outside of the frame beam 19. For this purpose the inner surface of the sleeve 37 is a rotatable fit on the outer surface of the frame beam 19. The sleeve 37 is provided with a safety bolt 60 which is screwed into a tapped hole in the top of the sleeve 37, the length of the shank of this safety bolt 60 being such that the end of the bolt remote from its head projects inwardly beyond the inner surface of the circular frame beam 19, so that this end is located in the hollow space inside the beam 19. For admitting this end of the bolt 60 the wall of the frame beam 19 has an elongated hole 61, the larger dimension of which extends parallel to a plane at right angles to the center line of the frame beam 19. The overall length of this elongated hole 61 is such that the gear boxes 20 and 21 and hence the rotors 22 and 23 can turn through an angle of about 20° with respect to the frame beam 19. The gear box of the other rotor 23 is built in a similar manner as the gear box 20, the gear box 21 being, of course, the mirror image of the gear box 20 with respect to a vertical plane going through the center line of the pivotal shaft 17, while, of course, the supporting sleeve 52, the bearings 53 and 54, the input shaft 24 and the bevel gear wheel 25 are omitted here and replaced by a closing cover fastened by means of the bolts 51.

It should be noted that the position of the sleeve 37 with respect to the frame beam 19 is determined in the first place by the sense of the driving torque exerted on the input shaft 24. With regard to the directions of rotation B and C of the rotors 22 and 23 respectively the sense of the driving torque is such that the safety bolt 60 engages that end of the elongated hole 61 where the angle between the center line of the shaft 50 and the horizontal plane is at its maximum. When the associated rotor strikes unevennesses of the ground surface, this position can change so that the center line of the shaft 50 is at a smaller angle to the horizontal plane, the center line then being, however, inclined upwardly and forwardly.

The portion of the shaft 50 located beneath the bottom of the ball bearing 59 is provided with splines 63 over a distance of about 75% of the distance between the bearings 49 and 59, a spacer sleeve 64 having corresponding internal splines being slipped onto the splined portion of the shaft 50 so that the top of the sleeve 64 bears on the lower side of the bearing 59. At a distance beneath the top of the sleeve 64 approximately equal to the diameter of the shaft 50 a substantially conical rotor sheath 65 is fastened to the sleeve 64 is a position such that the center line of this sheath coincides with the center line of the shaft 50.

The rotor sheath 65 has two portions. Near the shaft 50 is located a plate-shaped inner cone 66, the half apex of which amounts approximately to 75%. At the outer circumference the plate-shaped inner cone 66 terminates through an upwardly arcuated stiffening rim 67 in a plate-shaped outer cone 68 which is provided at its outer circumference with an upwardly directed flange 69. The center line of the outer cone 68 coincides with the center line of the shaft 50 and the half apex of this outer cone is about 65°. The tops of the conical plates 66 and 68 are located nearer the frame beam 19 than the outer circumferences of these plates. The radius of the circular stiffening rim 67, which is coaxial to the shaft 50, is approximately equal to the length of that portion of the shaft 50 which is located above the splines 63. The inner cone 66 is provided with four circular holes 70, the centers of which are located coaxially to the center line of the shaft 50 and at a distance from this center line which is approximately equal to half the radius of the inner cone 66.

By means of the bolts 57 a hood 71 is rigidly secured to the lower side of the gear box 20. A portion of this hood located beyond the bolts 57 is also conical in shape, the center line of this conical surface coinciding with that of the shaft 50. Half the apex of the conical portion of the hood 71 is equal to that of the outer cone 68. The outer rim of the hood 71 is located, viewed in the direction of the shaft 50, at such a level that this rim is located just inside and beneath the top edge of the stiffening rim 67. Between the outer rim of the hood 71 and the inner face of the stiffening rim 67 an air gap is left. The conical portion of the hood 71 has a plurality of elongated holes 72, the direction of length of which coincides with a generatrix of the conical outer part of the hood 71. The number of holes 72 is such that the overall surface area of the openings formed by these holes is at least equal to the overall surface area of the holes 70.

Near the lower end of the splined portion of the shaft 50, near the lower end of the sleeve 64, a lower cone 73 is provided so that its center line coincides with the center line of the shaft 50 and half the apex of its conical surface is equal to about 75° so that viewed in a radial direction away from the shaft 50 the surface of the outer cone 68 and of the lower cone 73 approach each other near the outer circumference. The plate-shaped lower cone 73 is a completely closed wall without holes and is provided near its outer circumference with a circular flange 74 extending downwardly. In a circular gap between the outer circumference of the outer cone 68 and that of the lower cone 73 a plurality of cutters project beyond the flanges 69 and 74. These are fastened by means of bolts 76 passed through the plates of the outer cone 68 and of the lower cone 73 inside the two flanges 69 and 74 (FIG. 3).

Beneath the splined portion of the shaft 50 a holder 77 is mounted to rotate freely about the shaft 50, the center line of this holder coinciding with that of the shaft 50. The holder 77 is journalled in two bearings 78 and 79, spaced apart from one another by a spacer sleeve 80 by a distance equal to or larger than the diameter of the shaft 50. The axial bearing 79 bears on a shoulder 81 fastened to the shaft 50 near the free lower end thereof. The lower end of the sleeve 64 bears on the top of the inner ring of the bearing 78. On the outer side of the holder 77 eight radial spokes are provided, four supporting spokes 82 thereof extending at a relative angle of 90°, viewed parallel to the shaft 50 and shaped in the form of a rectangle-section box, the opposite boundary walls of which converge pairwise in a direction away from the shaft 50. At the outer ends of these supporting spokes 82 a circular felly 83 is provided in the form of an elliptical tube forming a supporting body extending in a plane at right angles to the center line of the shaft 50. The supporting spokes 82 are orientated downwards from the holder 77 in the direction of the shaft 50 at an angle of 75° to 80°.

Between each pair of adjacent supporting spokes 82 one spoke-shaped support 84 (FIG. 1) is arranged. Viewed in a direction parallel to the shaft 50 the four supports 84 are each at an angle of 45° to the adjacent supporting spokes 82. The supports 84 are all formed by hollow, rectangle-section tubes, which are secured near their ends remote from the shaft 50 to the felly 83. A shaft 85 is welded to each of the four spoke-like supports 84 at a distance from the holder 77 equal to about 55 to 60 percent of the overall length of the support 84. The center lines of the four shafts 85 are at right angles to the center line of their corresponding supports 84 and located on an imaginary conical plane, the center line of which coincides with the center line of the shaft 50, while half the apex is about 15°. The tip of the last-mentioned cone located on the center line of the shaft 50 is located, viewed in the direction of the shaft 50, beneath the felly 83 so that the center line of the shaft 50 and the center lines of the shafts 85 diverge in upward direction (FIGS. 3 and 4).

Beneath the supports 84 dishes 86 are freely rotatable on the shafts 85. For this purpose the portion of each shaft 85 projecting beneath the support 84 is provided with a holder 87 which is freely rotatable in two bearings 88 and 89 located one above the other. The relevant dish 86 is fastened to the holder 87, and, viewed parallel to the shaft 85, it has a circular outer circumference. The dishes 86 are bodies of revolution and essentially form a closed, flat drum. They have each a top plate 90 having a punched-in stiffening rim 91 coaxial to the shaft 85. In each case, a plate-shaped screening hood 92 rigidly secured to the shaft 85 extends substantially parallel to a plane at right angles to the center line of the shaft 85 and is provided with a circular, downwardly bent-over flange 93, the lower end of which is located inside and beneath the topmost point of the stiffening rim 91. The outer circumference of the top plate 90 is joined by a bottom plate 94 of arcuate shape having a downwardly bent-over annular ridge 95 joining the outer edge and bent inwardly and again upwardly in the form of a stiffening rim 96. Away from the stiffening rim 96 the bottom plate 94 is bent over downwardly in the direction of the shaft 85 to form a second ridge 97 having midway a flange 98 by which the bottom plate is fastened to the holder 87. The dish 86 is arranged on the shaft 85 so that in a vertical direction the lower point of the ridge 95 of the bottom plate 94 projects beneath the felly 83.

Figures 4, 5:
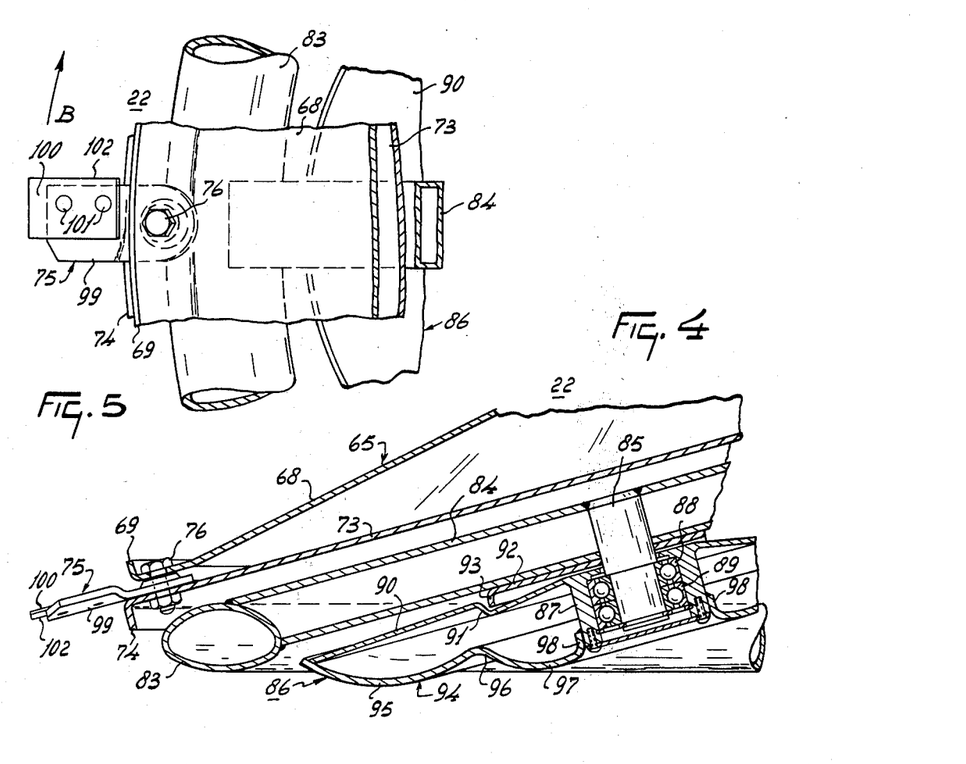

The cutters 75 in the form shown in FIGS. 4 and 5, at least four of which are provided on each of the rotors 22 and 23, are each freely pivotable about the center line of the bolt 76, which center line is a generatrix of an imaginary cone, the center line of which coincides with that of the shaft 50 and half the apex of which is equal to about 15°. The tip of this cone is located on the center line of the shaft 50 beneath the lower side of the felly 83.

At the end facing the shaft 50 each cutter 75 is located in the gap between the outer edges of the outer cone 68 and the lower cone 73. Each cutter 75 is made-up of a plate-shaped holder 99 and a plate-shaped cutting blade 100. The inner end of the holder 99 located in the gap just mentioned has a hole through which the bolt 76 is passed. A portion of the holder 99 located around the bolt 76 has a flat bottom engaging the top of the adjacent part of the lower cone 73. The portion of the holder 99 projecting in operation beyond the flange 74 is bent upwardly with respect to the portion around the bolt 76 so that, viewed in the direction of rotation B (FIG. 5) the foremost edge of this projecting portion is located at a lower level than the rear edge of the holder 99, while the holder portion located between the front and rear edges is again formed by a flat plate. The angle between this plate-shaped portion and a plane at right angles to the center line of the shaft 50 is about 10°. The cutter blade 100 is detachably fastened by fastening means 101 to the top of the flat, upwardly inclined portion of the holder 99 projecting beyond the flange 74 so that viewed parallel to the center line of the shaft 50 with respect to the direction of rotation B the cutting edge 102 is located in front of the front of the holder 99, whereas the edge of the cutting blade 100 remote from the shaft 50 extends in a radial direction beyond the outer edge of the holder 99. The foremost edge of the holder 99 is straight and coincides with a generatrix of the surface of the lower cone 73. The cutter 75 is rotatable about the bolt 76 through 360° and the upwardly bent-over rearmost portion of the part projecting in operation out of the flange 74 is shaped so that its height is slightly smaller than the distance between the lower face of the outer cone 68 and the top of the lower cone 73 at the area of the gap around the bolt 76.

Figures 6, 7, 8:
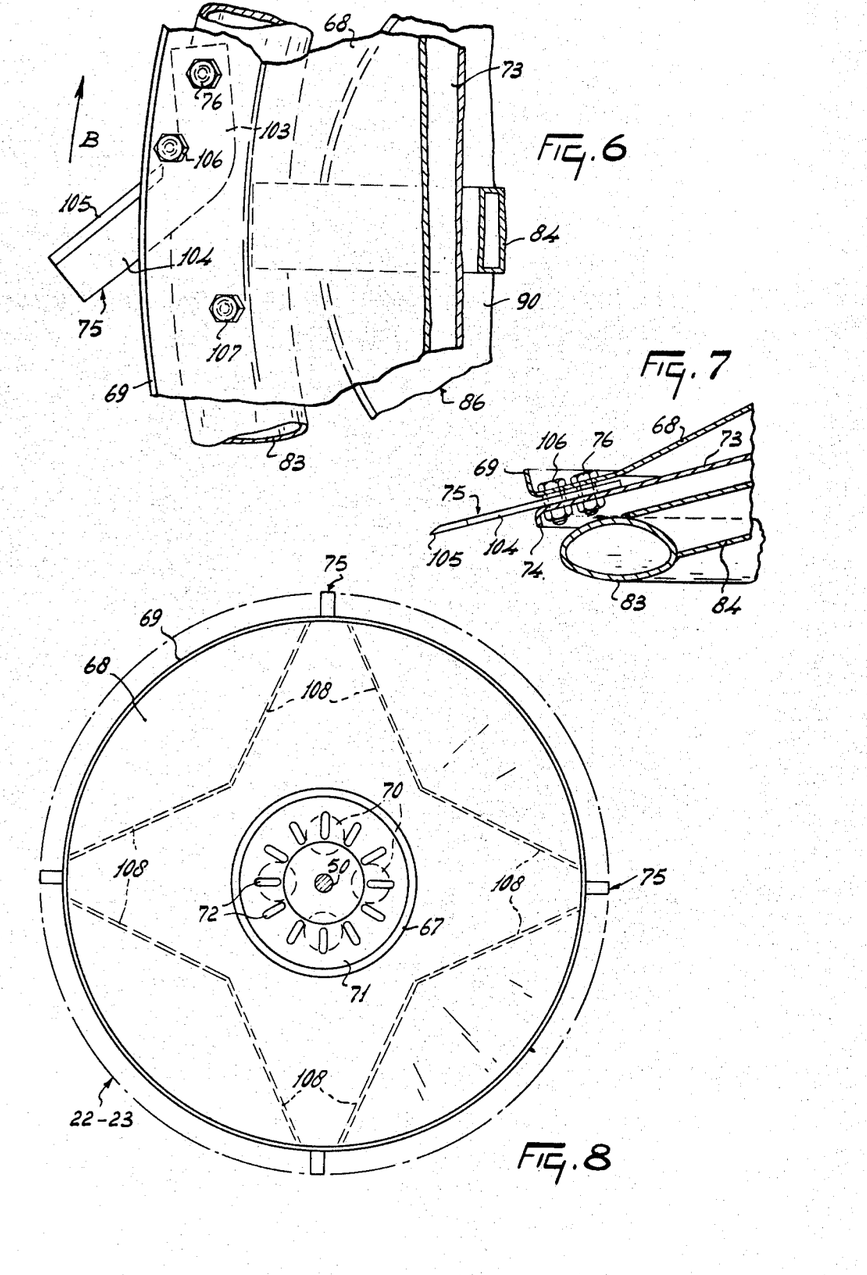
FIG. 6 is a plan view similar to FIG. 5 but showing another form of cutter construction.
FIG. 7 is a sectional view taken on the line IV—IV in FIG. 1 of the embodiment shown in FIG. 6
FIG. 8 is a schematic plan view of a rotor.

The second form of the cutter 75 shown in FIGS. 6 and 7 is made from a single flat length of spring steel wire mainly shaped in the form of two joined rectangles. The first rectangle 103 has a hole near its free end for receiving the bolt 76. This portion is constantly located completely beneath the outer cone 68. The second rectangle 104 is arranged relative to the rectangle 103 so that they are at an angle of about 125° to one another. The second rectangle 104 is provided at its front, viewed in the direction of rotation B, with a cutting edge 105. The second rectangle 104 is located, viewed in a direction parallel to the shaft 50, for the major part outside the flange 74. Between the outer cone 68 and the lower cone 73 two stops in the form of bolts 106 and 107 are provided, mounted like the bolt 76. The bolt 106 is located near the bolt 76 at a distance approximately equal to the width of the two rectangles 103 and 104 so that the cutting edge 105 is in operation at an angle of about 45° to a local radial line. The radial distance of the bolt 106 from the center line, of the shaft 50 slightly exceeds that of the bolt 76 and the corresponding radial distance of the bolt 107 is smaller than that of the bolt 76. The bolt 106 is arranged so that, when the cutter 75 swings outwardly the cutter abuts against the bolt 106 near the outer side of the transition between the two portions 103 and 104. The bolt 107 is disposed so that, when the cutter 75 swings inwardly, the rearmost edge of the second rectangle 104, viewed in the direction of rotation B, engages the bolt 107 near the free end of the cutter. The cutter 75 shown in FIGS. 6 and 7 is thus freely pivotable about the bolt 76 between the stops 106 and 107. The cutter 75 extends parallel to the adjacent surface of the lower cone, but as in the first form it may alternatively be shaped so that the cutting edge 105 is located at a lower level than the lower side of the rectangle 104, the rear edge being bent over upwardly. The structure described above for the rotor 22 is similar to that of the rotor 23.

Apart from the structural measures described above, the following steps may be taken with respect to the rotors (shown schematically in FIG. 8). In this form the rotor has four cutters 75. In the space between the outer cone 68 and the lower cone 73 guide plates 108 of the kind shown in broken lines in FIG. 8 are provided. These closed guide plates 108 cover the whole height of the space between the outer cone 68 and the lower cone 73 and join these conical surfaces at their top and bottom edges. For mounting purposes they may be provided at their top and bottom edges with tags extending through corresponding slots in the plates 68 and 73, these tags being bent over in known manner after the plates 108 are arranged in place. Near each of the cutters 75 are disposed the outermost ends of two of the plates 108, which converge in the direction of the cutter, viewed parallel to the shaft 50. The outer edges of these two plates 108 are located in the gap near the outer edges of the cones 68 and 73 and are spaced apart on either side of the cutter by a distance approximately equal to twice the width of the portion of the cutter projecting beyond the flange 74. The plates 108 terminate internally at a relatively short distance in front of the stiffening rim 67 and the inner ends of any two of the plates 108 associated with the same cutter 75, viewed parallel to the rotary shaft, are spaced apart by a distance approximately equal to the diameter of the stiffening rim 67. Near this end of each plate 108 the plate joins an adjacent one of the guide plates 108 directed towards an adjacent cutter 75. The connection between the two joining plates 108 is completely closed so that between the two conical surfaces 68 and 73, viewed parallel to the shaft 50, beyond the stiffening rim 67 a space in the form of a star, viewed on plan, is formed, which is completely closed inside the rotor and communicates with the open air only at the area of the cutters through the gaps on either side of the cutters and through the holes 70.

The machines described above operate as follows: In operation the machine occupies the position shown in full lines in FIG. 1. The input shaft of the gear box 10 is driven by the power take-off shaft of the tractor 3. The rotary movement of the output shaft 11 resulting therefrom is transmitted through the auxiliary shaft 25 to the input shaft 24 of the gear box 20. The rotary movement of the input shaft 24 is transmitted via the bevel gear wheels 55 and 56 to the shaft 50 of the rotor 22, and via the bevel gear wheel 47 and the driving shaft 46 in a similar manner to the shaft 50 of the rotor 23 so that the two rotors are driven in opposite senses in the directions of the arrows B and C in FIG. 1. The frame of the machine is constructed so that the rotors can follow the ground and the unevennesses thereof since the frame beam 19 together with the rocking member 18 is able to swing in a vertical direction about the pivotal shaft 17, while the supporting beam 2 is adapted to turn by means of the pivotal shaft 16 with respect to the coupling beam 1 rigidly secured in operation to the tractor 3.

In order to change over the machine to a transport position in which the two rotors are located inside the tractor track, the locking pin 32 is loosened and the ear 33 is slipped off the rearmost end of the pivotal shaft 17. Subsequently the supporting beam 2 together with the rotors 22 and 23 is turned rearwardly about the pivotal shaft 12 through an angle of about 120° (position indicated by broken lines in FIG. 1), after which the loosened setting beam 30 is fastened by means of the locking pin 32 on one side of the ear 8, and on the other side of the setting beam 30 and the ear 33 is slipped onto the pin 34 on the gear box 21 and secured thereto.

The machine has many possibilities for matching in operation the unevennesses of the ground (in the position indicated by solid lines in FIG. 1). Apart from the possibilities provided by the pivotal shafts 16 and 17, there is the possibility for the rotors 22 and 23 to move individually with respect to the frame beam 19 so that the center line of the shaft 50 can reciprocate in a plane at right angles to the frame beam 19 about the center lines of the input shaft 24 and of the driving shaft 46 because the lower end of the bolt 60 can reciprocate in the elongated hole 61.

During the rotation of each of the rotors the supporting spokes 82 secured to the holder 77 and the support 84 together with the felly 83 and the dishes 86 can turn freely about the shaft 50 independently of the rotary movement of the rotor concerned. This movement and the sense thereof are determined by the ground contact of the felly 83 or one or more of the dishes 86 or by their contact with random unevennesses. The gliding resistance of the felly 83 on the ground is drastically reduced since the lower faces of the dishes 86 projecting beneath the lower face of the felly 83 are capable of rotating freely independently of the felly 83, these dishes being journalled on a shaft at the side of the shaft 50 of the rotor. Apart from the structure shown a shaft 85 crossing the shaft 50 contributes to this effect. Since the shaft 50 of each of the rotors is substantially vertical, practically always one or more of these dishes will be in direct contact with the ground.

Since the portions of the cutters 75 projecting beyond the felly 74 in the embodiment shown in FIGS. 4 and 5, viewed opposite the direction of rotation B, are inclined rearwardly and upwardly, the air stream thus produced will displace the mown crop readily across the slightly inclined outer cone 68 to the rear with respect to the rotor.

During the rotation of the rotors the air contained between the outer cone 68 and the lower cone 73 emerges vigorously through the gap between the outer circumferences of these two cones, owing to centrifugal force. This air enters through the elongated holes 72 in the stationary hood 71 and through the holes 70 in the inner cone 66 of the rotor sheath 65. In order to further this outward radial air stream air blades may be provided above the holes 70 on the inner cone with their open sides in the directions of rotation B and C respectively, while, if necessary, the screening hood 71 protecting the hub part of the rotors from penetrating dirt may be omitted.

For further improving the transport of air a compressor disc of the kind usually employed in a radial compressor may be fastened, beneath the inner cone 66, to the shaft 50. The air stream emerging from the gap blows the cut crop from around the cutters so that soiling of the cutter fastenings is minimised, while this air stream in co-operation with the aforesaid air stream along the cutters shown in FIGS. 4 and 5 will conduct away the crop across the top of the flat rotor sheath 65.

In order to ensure adequate rotation of the air between the outer cone 68 and the lower cone 73, while the rotor is rotating, if the centrifugal force exerted on the air were insufficient, the guide plates 108 shown in FIG. 8 are provided. These plates compel the air entering through the holes 70 to rotate with the rotor so that this air is exposed to a maximum centrifugal force. This centrifugal force is determined by the diameter of the rotor, which is at least 1 to 1.2 ms and by the rotational speed of the rotor, which is at least 2000 rev/min or more. The disposition of the guide plates 108 as shown in FIG. 8 has the advantage that all air penetrating on the top of the rotor is concentrated on the cutters so that around these cutters a strong radial air stream is produced to the outside. Moreover, this arrangement of the guide plates 108 has the advantage that no air emerges from the gap between two adjacent cutters so that the stems of the crop to be mown will not be bent by such an air stream, which might be harmful to the cutting effect of the cutters.

Apart from the advantages of the structure of the cutters shown in FIGS. 4 and 5, in which the cutter 75 is orientated outwardly by centrifugal force and in which the cutter can pivotally deflect about the bolt 76 in the event of obstacles, the cutter structure shown in FIGS. 6 and 7 has the advantage that owing to the inclined position of the cutting edge 105 with respect to the direction of movement B a very sharp, effective cutting edge is formed. Owing to centrifugal force the cutter engages the bolt 106 and when striking unevennesses or obstacles, the cutter can deflect inwardly until it arrives at the stop 107. In this position the cutter 75 is located completely inside the flange 74. The cutter swinging subsequently outwardly directly reengages the bolt 106 so that it does not perform a plurality of oscillations about its pivotal axis before reaching the normal operational state.

While various features of the mowing machines that have been described, and that are illustrated in the drawings, will be set forth in the following claims as inventive features, it is to be noted that the invention is not necessarily limited to these features and that it encompasses all of the features that have been described and illustrated both individually and in various combinations.

What I claim is:

1. A mowing machine comprising a mobile frame and mowing means supported on said frame, said mowing means including at least one mowing member that is rotatable about an upwardly extending axis, said mowing member having an outer circumference and cutting means adjacent said circumference, said machine having driving means connected to said mowing means to rotate said cutting means about said upwardly extending axis, at least one supporting member being rotatably mounted on said mowing member and said supporting member being rotatable about a separate axis of rotation that is spaced from said upwardly extending axis, said supporting member being freely rotatable about said separate axis of rotation independently of said driving means.

2. A mowing machine as claimed in claim 1, wherein said supporting member is a dish.

3. A mowing machine as claimed in claim 2, wherein said mowing member comprises four dishes which are rotatably mounted on corresponding separate axes of rotation.

4. A mowing machine as claimed in claim 3, wherein each of said dishes is located the same distance around said upwardly extending axis and the circumferential angles between two adjacent dishes are the same.

5. A mowing machine as claimed in claim 3, wherein, viewed parallel to said upwardly extending axis, said dishes are located inside the circumference of said mowing member.

6. A mowing machine as claimed in claim 3, wherein said mowing member has a lower supporting body that is freely rotatable and said dishes are fastened to said body.

7. A mowing machine as claimed in claim 6, wherein said supporting body is freely rotatable around said upwardly extending axis independently of said cutting means.

8. A mowing machine as claimed in claim 7, wherein said supporting body comprises an outer felly on spokes.

9. A mowing machine as claimed in claim 8, wherein at least one of said dishes is located beneath the supporting body.

10. A mowing machine as claimed in claim 9, wherein said one dish, viewed on plan, is located within the perimeter of said felly.

11. A mowing machine as claimed in claim 10, wherein the lowermost portion of said one dish is located, at least during operation, within the circumference of said mowing member.

12. A mowing machine as claimed in claim 3, wherein at least one of said dishes is a completely enclosed revolvable body.

13. A mowing machine as claimed in claim 3, wherein the lower side of at least one of said dishes has at least one corrugation with a convex side thereof facing the ground.

14. A mowing machine as claimed in claim 3, wherein said mowing member has a protective hood that overlies said dishes.

15. A mowing machine as claimed in claim 3, wherein the center line of said separate axis of rotation of at least one of said dishes is the generatrix of an imaginary cone, the center line of which coincides with that of said mowing member, the apex of said cone being located beneath said mowing member.

16. A mowing machine as claimed in claim 3, wherein said dishes depend from the mowing member and the latter includes a felly supported by rectangle-section spokes, said spokes having opposite walls which converge outwardly.

17. A mowing machine as claimed in claim 3, wherein said mowing member includes a felly and prismatic spokes, said dishes being independently mounted for rotation on said felly and spokes.

18. A mowing machine as claimed in claim 17, wherein at least one of said dishes is directly fastened to one of said prismatic spokes.

19. A mowing machine as claimed in claim 1, wherein said mowing member comprises two plate-shaped conical surfaces located one above the other and the center lines of said conical surfaces coincides with that of said upwardly extending axis, the apices of said conical surfaces being located above the respective remainders of said surfaces.

20. A mowing machine as claimed in claim 19, wherein half the apex of the upper conical surface is about 65°.

21. A mowing machine as claimed in claim 19, wherein half the apex of the lower conical surface is about 75°.

22. A mowing machine as claimed in claim 19, wherein said two conical surfaces converge away from said upwardly extending axis in an outward radial direction.

23. A mowing machine as claimed in claim 19, wherein adjacent said circumference, said mowing member has an outlet for air and at least one opening adjacent said upwardly extending axis.

24. A mowing machine as claimed in claim 1, wherein there are a pair of mowing members rotatably mounted adjacent one another on said frame and said driving means is connected to said mowing members to rotate same in relative opposite directions.

25. A mowing machine as claimed in claim 24, wherein the diameter of each mowing member is about 1 to 1.2 ms.

26. A mowing machine as claimed in claim 24, wherein said mowing members are pivotable together with a part of said frame about a horizontal pivotal axis extending in the normal direction of travel of the machine.

27. A mowing machine as claimed in claim 26, wherein said horizontal pivotal axis is located laterally to one side of said mowing members.

28. A mowing machine as claimed in claim 26, wherein a pivotal shaft on said frame is located between said mowing members and the latter are mounted on said frame to pivot about said shaft during travel.

29. A mowing machine comprising a frame movable over the ground and said frame supporting mowing means, said mowing means comprising a plurality of mowing members rotatable about upwardly extending shaft means supported on said frame, each mowing member having a circumference and cutting means located adjacent said circumference, said frame including a supporting beam that extends transverse to the normal direction of travel during operation and said beam being connected to a coupling member for hitching said machine to a prime mover, a setting beam interconnecting said supporting beam with said coupling member during operation, said mowing members being pivotally supported from said supporting beam in side-by-side operative positions, said setting beam being disconnectable from an operative position and reconnectable to said supporting beam to retain the latter together with said mowing members in a transport position to the rear of said coupling member.

* * * * *